US009613230B2

(12) United States Patent
Gut et al.

(10) Patent No.: US 9,613,230 B2
(45) Date of Patent: Apr. 4, 2017

(54) PLUG PART FOR FORMING A PLUG-IN CONNECTION

(71) Applicant: SELECTRON SYSTEMS AG, Lyss (CH)

(72) Inventors: Max Gut, Weggis (CH); Bernd Riedel, Hagneck (CH)

(73) Assignee: SELECTRON SYSTEMS AG (CH)

( * ) Notice: Subject to any disclaimer, the term of this patent is extended or adjusted under 35 U.S.C. 154(b) by 0 days.

(21) Appl. No.: 14/426,530

(22) PCT Filed: Sep. 10, 2013

(86) PCT No.: PCT/EP2013/068747
§ 371 (c)(1),
(2) Date: Mar. 6, 2015

(87) PCT Pub. No.: WO2014/037586
PCT Pub. Date: Mar. 13, 2014

(65) Prior Publication Data
US 2015/0213291 A1 Jul. 30, 2015

(30) Foreign Application Priority Data
Sep. 10, 2012 (CH) ........................................ 1649/12

(51) Int. Cl.
*G06F 21/12* (2013.01)
*G06F 21/85* (2013.01)
(Continued)

(52) U.S. Cl.
CPC ............ *G06F 21/85* (2013.01); *G06F 21/123* (2013.01); *H01R 13/665* (2013.01);
(Continued)

(58) Field of Classification Search
None
See application file for complete search history.

(56) References Cited

U.S. PATENT DOCUMENTS 7,014,500 B2   3/2006  Belesimo
7,712,131 B1 *  5/2010  Lethe ...................... G06F 21/57
                                                      701/29.1
(Continued)

FOREIGN PATENT DOCUMENTS

DE   198 12 901 A1   9/1999
DE   103 51 773 A1   6/2004
(Continued)

OTHER PUBLICATIONS

International Search Report dated May 21, 2014 issued in corresponding International patent application No. PCT/EP2013/068747.
(Continued)

*Primary Examiner* — David Pearson
(74) *Attorney, Agent, or Firm* — Ostrolenk Faber LLP

(57) ABSTRACT

The plug part (10) is connectable to a mating part (1), which is used as a connector of a device (50), to form a plug-in connection. The plug part (10) includes at least one non-volatile memory (13), a communication unit (15) and a microprocessor (14). A network having such plug parts (10) can be tested by means of a testing device, which is designed to generate test signals from information stored in the memory (13), which test signals can be laid on the cable wired leading out of the plug part (10) in order to generate measurement signals. The memory (13) preferably contains a list of permissible combinations of hardware and software versions, which can be compared with the current hardware and software combination of the device (50) in order to configure the device (50) and/or authorize the device (50) for normal operation.

31 Claims, 7 Drawing Sheets

(51) Int. Cl.
*H01R 13/66* (2006.01)
*H01R 13/639* (2006.01)

(52) U.S. Cl.
CPC ..... *H01R 13/6691* (2013.01); *H01R 13/6397* (2013.01); *H01R 2201/20* (2013.01)

(56) References Cited

U.S. PATENT DOCUMENTS

| | | | |
|---|---|---|---|
| 2003/0073343 A1 | 4/2003 | Belesimo | |
| 2003/0100297 A1* | 5/2003 | Riordan | G06F 8/60 455/418 |
| 2004/0117515 A1 | 6/2004 | Sago et al. | |
| 2004/0123127 A1* | 6/2004 | Teicher | G06F 21/78 713/193 |
| 2005/0222718 A1* | 10/2005 | Lazarz | G06F 21/34 701/1 |
| 2007/0103277 A1 | 5/2007 | Yuk et al. | |
| 2009/0094597 A1* | 4/2009 | Moskalik | G06F 12/1408 717/174 |
| 2009/0183256 A1* | 7/2009 | Mo | G06F 12/1466 726/21 |
| 2011/0043371 A1 | 2/2011 | German et al. | |
| 2011/0144823 A1 | 6/2011 | Muller et al. | |
| 2012/0051735 A1* | 3/2012 | Achkir | H04L 43/50 398/16 |
| 2012/0133490 A1 | 5/2012 | Downie et al. | |
| 2013/0046987 A1* | 2/2013 | Radhakrishnan | H04L 63/105 713/172 |
| 2013/0117854 A1* | 5/2013 | Britton | G06F 21/56 726/24 |

FOREIGN PATENT DOCUMENTS

| | | |
|---|---|---|
| DE | 10 2005 002 472 A1 | 7/2006 |
| DE | 20 2006 015797 U1 | 2/2008 |
| EP | 1 818 859 B1 | 8/2007 |
| GB | 2 264 843 | 9/1993 |
| WO | WO 99/18496 A1 | 4/1999 |

OTHER PUBLICATIONS

Chinese Office Action with Search Report dated Sep. 5, 2016 issued in corresponding CN Application No. 201380047113.0 with English translation.

* cited by examiner

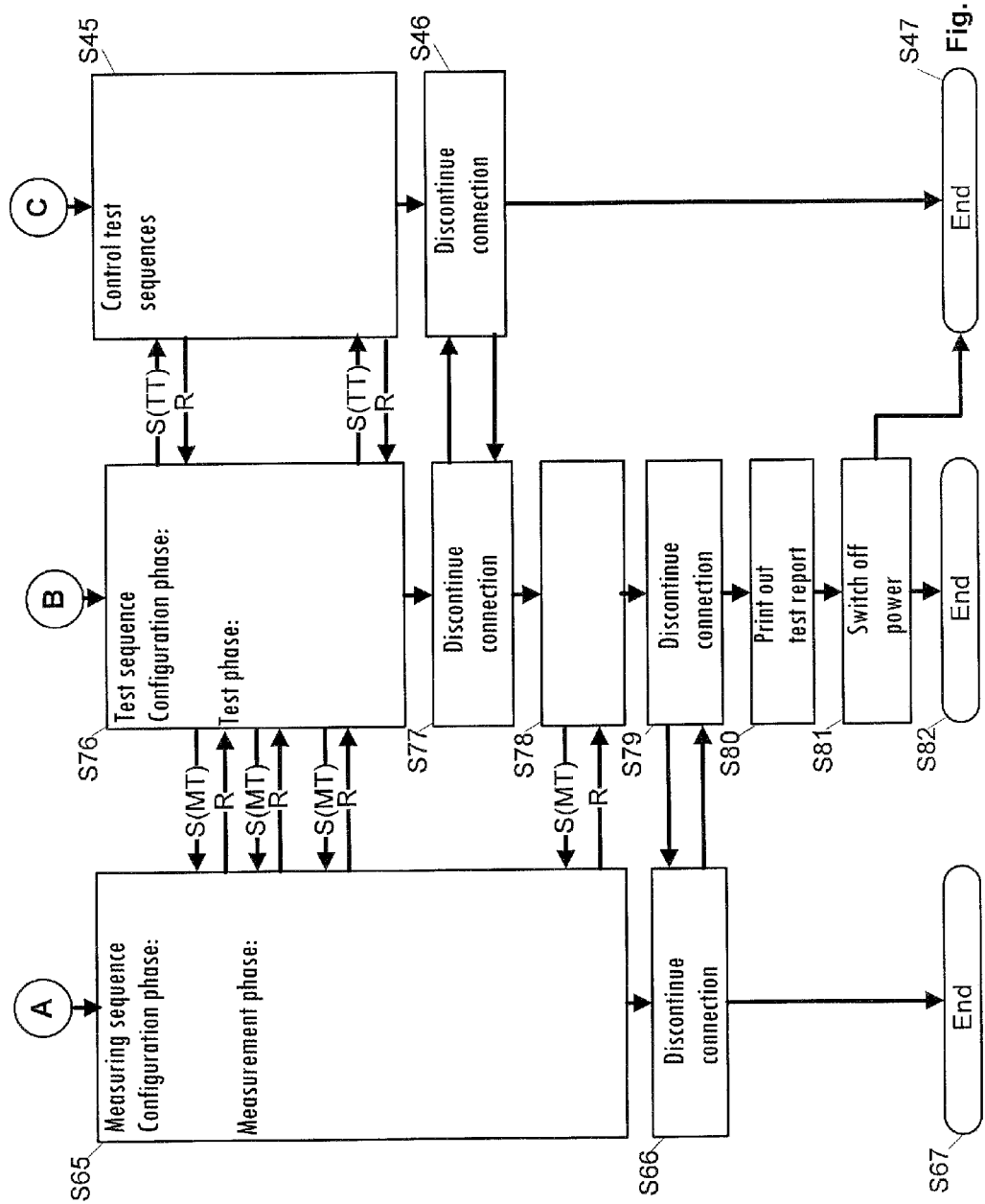

PLUG PART FOR FORMING A PLUG-IN CONNECTION

CROSS REFERENCE TO RELATED APPLICATIONS

The present application is a 35 U.S.C. §371 National Phase conversion of PCT/EP2013/068747, filed Sep. 10, 2013, which claims benefit of Swiss patent application no. 01649/12, filed Sep. 10, 2012, the disclosure of which is incorporated herein by reference. The PCT International Application was published in the German language.

TECHNICAL FIELD OF THE INVENTION

The present invention relates to a plug part that is connectable to a mating part for forming a plug-in connection, the mating part being used as a connector of a device, preferably to a network.

BACKGROUND OF THE INVENTION

In a variety of networks, devices are connected to one another and to signal sources and power sources on the one hand, and to signal sinks or power loads on the other hand, by means of disconnectable plug-in connections. These disconnectable connections, which may be formed from plug parts and their mating parts, allow the rapid exchange of devices. Likewise, these connections are frequently used as test points during initial start-up and troubleshooting. However, the cabling is often susceptible to malfunctions, and the troubleshooting is often laborious.

It is known from DE 103 51 773 A1 and EP 1 818 859 B1 to provide the plug part with a transponder, in which an identifier is stored. The identifier is transmitted to the device to check whether the plug part is plugged into the correct mating part. This type of design of the plug part has only limited applications.

A software protection device for a textile machine is presented in Unexamined German Patent Application DE 10 2005 002 472 A1. The cited document describes how software may be protected from piracy by storing information in a so-called "dongle," and how the machine functionality which is controlled via the software may be influenced in accordance with licensing.

The field of application is limited to textile machines, so that, among other things, it is not provided to link machine-specific data to other data stored in the dongle in order to thus enforce safety-relevant checks of certified, permissible hardware and software combinations, or to store data of peripheral devices, connected to a network, in the dongle and to interlink the data.

U.S. Pat. No. 7,014,500 B2 discloses a test method for identifying cables in star-shaped cable systems, the star point being a "patch panel." As described, this system is used primarily in the field of computer cabling, in which a plurality of cables of the same type with an identical, and usually standardized, plug pin-wire conductor assignment is implicitly provided. This method is not suited for testing wiring by means of cable trees, which are customary in aircraft manufacturing or automobile manufacturing, for example, for the following reasons:

1) A cable tree, which by definition is made up of multiple wires (cable wires) which are locally branched, and in which not all wires of one cable from a first plug lead to exactly one second (remote) plug, but instead, the wires which are combined in a cable tree may be in an n:m relationship with multiple plugs.
2) The described test method must be uniform at all plugs, and two dedicated pins must be kept available for the test situation, which may not be the case for a large number of different sensors and actuators that are used.
3) In general, two wires of each plug must be continually provided for each plug for the test situation, which would represent a considerable material outlay.
4) It is a prerequisite that the wires reserved for the test situation must a priori be correctly wired (wire-to-pin assignment), and must have no cable break.
5) With the described test method, in the best case it is possible to check the correct functionality of the wires provided for the test situation (to test whether the test situation is functional), but not of the other wires of the same cable tree, which are necessary for the actual system functionality.
6) The described test method is not able to detect an incorrect plug pin-wire assignment, or short circuits between individual wire conductors, or breaks in individual wires.
7) Test setup and operation by one person is not provided.

SUMMARY OF THE INVENTION

It is therefore an object of the present invention to provide a plug part having expanded applications.

A plug part which achieves this object is set forth in claim 1. The other claims set forth preferred embodiments, as well as a method for programming a plug part according to the invention, various arrangements, and a system including at least one plug part according to the invention, a method for operating a device, in which at least one plug part according to the invention is used, and test apparatuses and methods for testing a network.

A wide range of applications is made available by providing the plug part with a microprocessor according to claim 1.

It is thus possible, for example, to swap out configuration parameters, which are customarily stored in the device, in the plug part and to use the plug part for controlling the connected device in order to configure same.

In addition, the option is provided for using the plug part for authorizing operation of the device. It is thus possible, for example, to prevent safety requirements from being violated by operation with uncertified hardware and/or software. This is preferably achieved by storing in the memory of the plug part at least one of the following pieces of information which define the setpoint status data:

Version of the hardware of the device,
Version of the software of the device,
Permissible combinations of hardware and software versions.

The actual status data, i.e., the current versions of hardware and software, are preferably contained not on the plug part, but, rather, in the components within the device. Unauthorized operation of the device may be prevented by reading out these actual status data and comparing them to the setpoint status data. In addition, the functional overall system compatibility is enforceable even when system parts are exchanged (whether for reasons of security, obsolescence of parts of the system, or other aspects, such as replacement during repairs).

It is also preferred that at least a portion of the information stored in the memory is encapsulated. This prevents the device from directly accessing the information. Furthermore, impermissible alteration of this encapsulated information is not possible.

Another application results for the testing of networks, which may be greatly simplified by use of the plug part.

Thus, for example, the testing of wiring in cable trees, in which the wires of one plug part may lead to more than one other plug part, is simplified. The plug parts may be designed in such a way that, in contrast to U.S. Pat. No. 7,014,500 B2, for example, it is not necessary to provide uniformly and permanently pins and wires for the test situation, it is possible to detect an incorrect plug pin-wire assignment as well as short circuits between individual wire conductors, breaks in individual wires, and the like, and the test setup and operation may be performed by one person.

If a cable leads out from the plug part for connection to at least one device in a network, such as a peripheral device (field device) or control device, information concerning the at least one device is storable in the memory of the plug part. As a result, in particular checking the point-to-point connection of each individual cable wire conductor in the network is greatly simplified.

BRIEF DESCRIPTION OF THE DRAWINGS

The invention is explained below based on exemplary embodiments, with reference to the figures, which show the following:

FIGS. 10a and 10b show a sequence of a second exemplary embodiment of an application.

DESCRIPTION OF EMBODIMENTS

Figure 1:
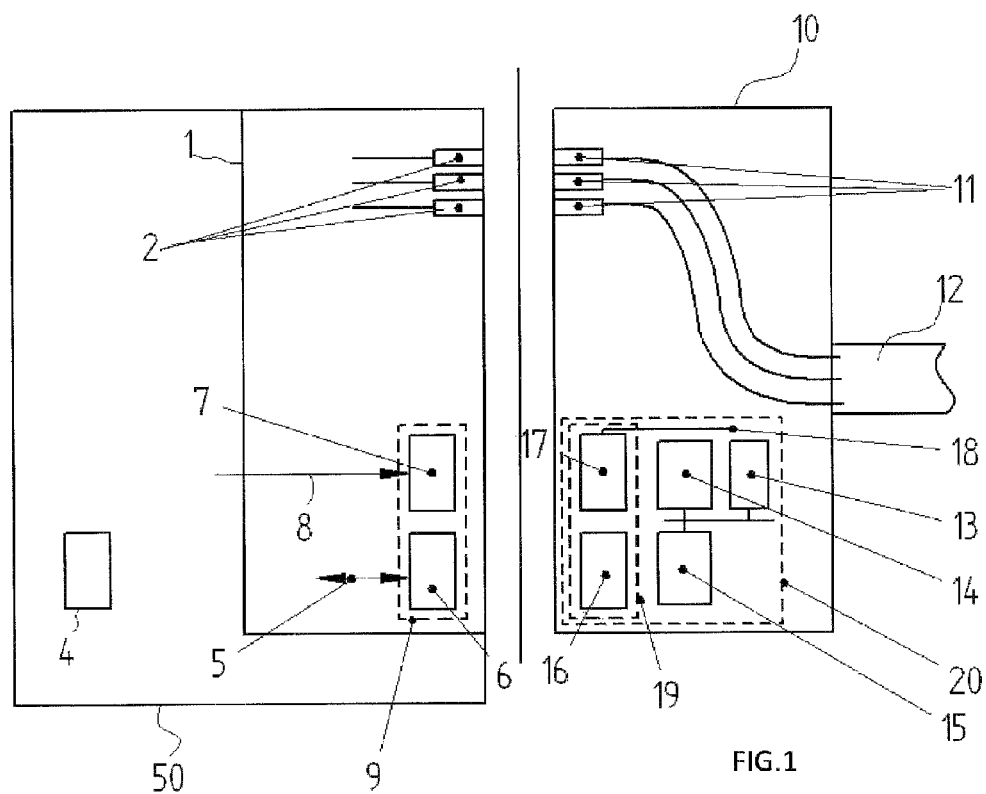
FIG. 1 shows one exemplary embodiment of a plug-in connection for a device, in a conceptual illustration.
Figure 2:
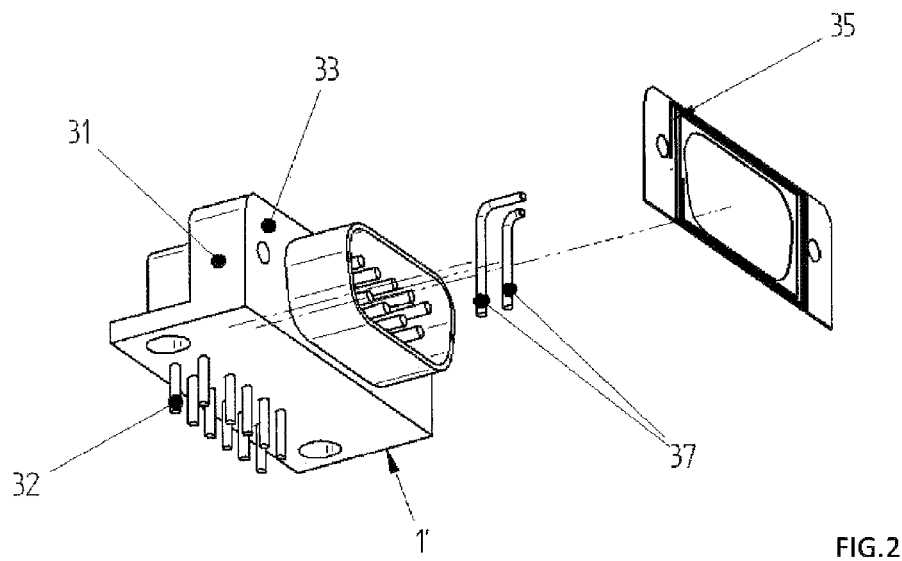
FIG. 2 shows one exemplary embodiment of a mating part for forming a plug-in connection, in an exploded view.
Figure 3:
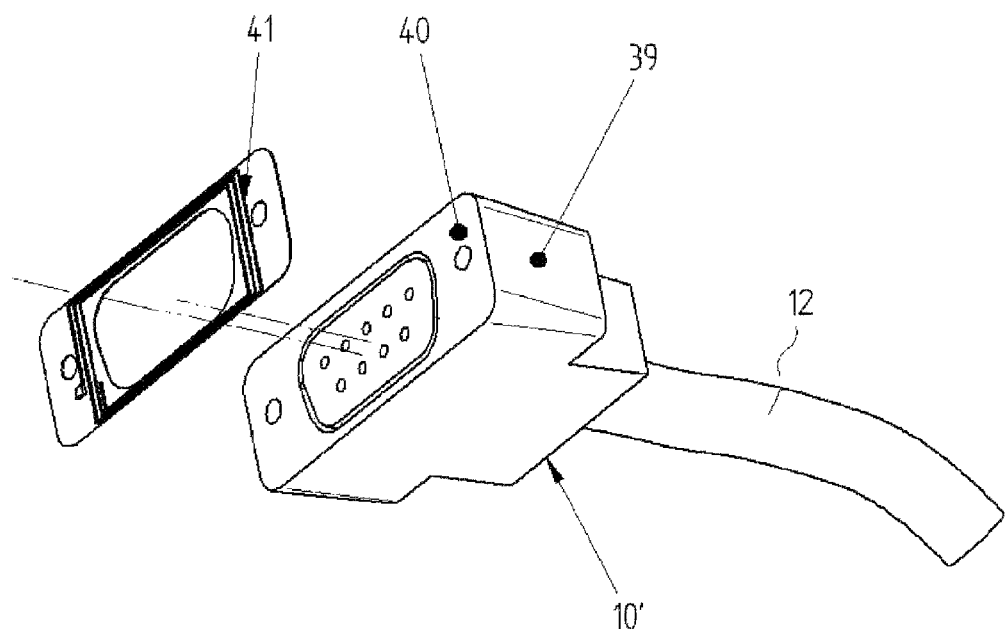
FIG. 3 shows one exemplary embodiment of a plug part which is connectable to the mating part according to FIG. 2, in an exploded view.
Figure 4:
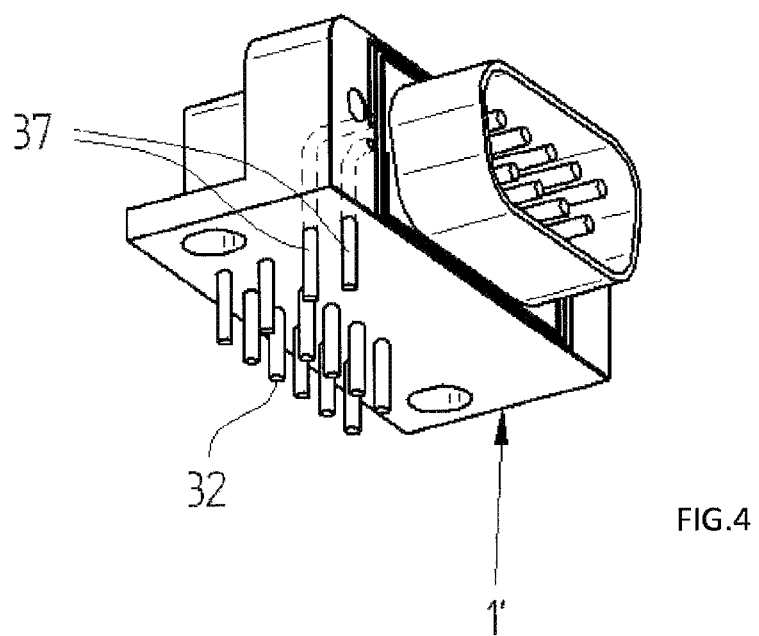
FIG. 4 shows the mating part according to FIG. 2 in the assembled state, in a perspective view.
Figure 5:
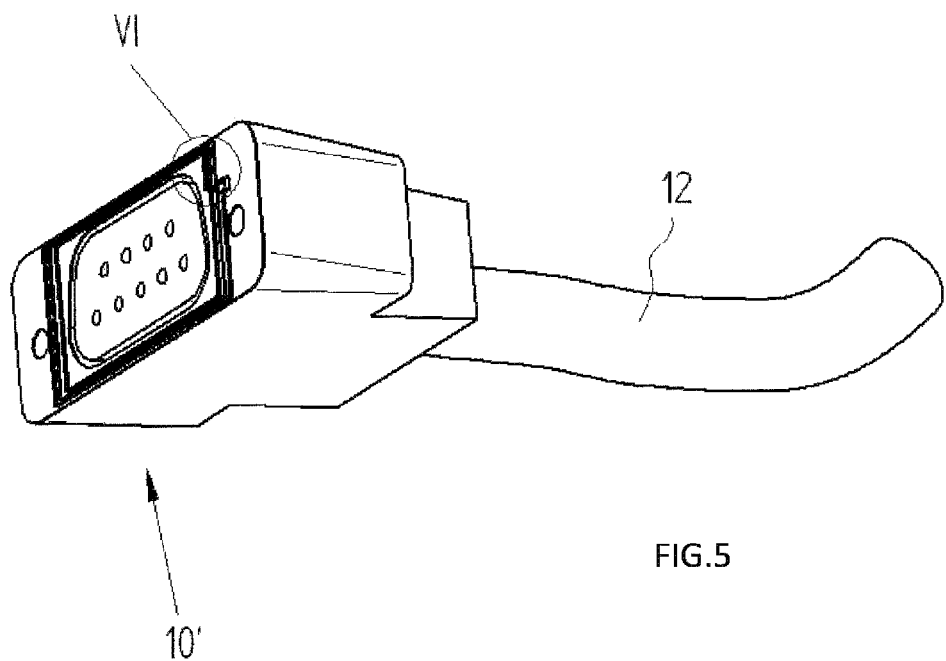
FIG. 5 shows the plug part according to FIG. 2 in the assembled state, in a perspective view.
Figure 6:
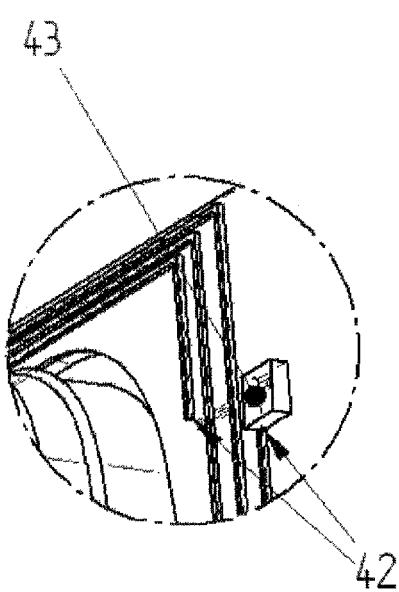
FIG. 6 shows a detailed view according to the circle VI in FIG. 5.

FIG. 1 shows one exemplary embodiment of a plug-in connection for a device 50, in a conceptual illustration.

The device 50 includes at least one connector 1 as access to a network, via which electrical power and/or information is/are transmitted. The device 50 is used, for example, as a control unit in the form of an automation device as used in automation systems. This type of automation device is configured for executing a control program for influencing a process to be controlled, and is in operative connection with field devices, among other elements. The field devices are typically situated in the network in the vicinity of the process to be controlled, and are used for detecting process variables and/or for influencing the process. Sensors and actuators are such field devices.

In addition to other devices such as the device 50 and actuators and sensors, further network components may be connected to the network. Such network components are, for example, electrical or electronic units which are used for input (for example, buttons, switches, etc.) or for output (for example, LEDs or other illumination means).

As mentioned above, the device 50 is preferably designed as a control unit, in particular as a programmable logic controller (PLC). If a peripheral device (field device) is structured and/or configurable similarly as for such a control unit 50, the following description likewise naturally applies.

The device 50 includes components, such as a microprocessor 4, which allow signals to be read in and processed, and the processed signals, for example, to be directly output to a field device and/or supplied to a higher-level communication network. This typically takes place at repeated intervals in a system of an automation system which includes sensors and actuators. The state of the system is detected by sensors and provided as input signals to control units in the form of the device 50. Based on the input signals, by means of the provided processing procedures (application program), output signals are generated which ultimately control the actuators in such a way that the state of the system is changed in a targeted manner, or also maintained as is.

To establish the plug-in connection, which forms a mechanically disconnectable point to the network, a plug part 10 is provided which is connectable to the connector 1, designed as a mating part, on the device 50. The device 50 typically has a housing, on one side of which the mating part 1 is situated. For this purpose, the mating part 1 is, for example, installed in the housing or mounted on same.

The mating part 1 has useful contacts 2 which are connected to the data processing components of the device 50. The useful contacts 11 on the plug part 10 are connected to a cable 12 which leads out from the plug part 10.

The cable 12 does not necessarily have to be present. It may be absent, for example, if the plug part is used strictly for configuring the device 50, and another plug part 10 having a cable 12 is provided via which the connection of the device to the network takes place. Similarly, the device 50 may have a first connector that is used strictly for configuring the device 50, and a second connector which is used as the connection to the network. Depending on the intended application, the first connector and/or the second connector is/are designed in the form of the mating part 1, which is connectable to the plug part 10.

The useful contacts 2, 11 are situated, for example, on plug elements in the form of outwardly facing contact pins and, complementary thereto, inwardly facing contact openings (not illustrated in FIG. 1). Depending on the intended application, the contact pins are situated on the plug part 10, on the mating part 1, or on both. Correspondingly, the plug part 10 forms a male part (plug), a female part (coupling), or a part having both genders. Similarly, the mating part 1 has a complementary design as a coupling (socket), a plug, or a part having both genders. The plug elements may also have a design other than in the form of contact pins and contact openings. For example, it is conceivable to implement the one plug unit (plug part 10 or mating part 1) directly as part of a printed circuit board having contact points that are contactable with spring contacts in the other plug unit (mating part 1 or plug part 10). When the plug part 10 or the mating part 1 is referred to below as a "plug" by way of example, all possible embodiments as mentioned above are thus encompassed.

Furthermore, elements that are situated on the side of the plug part 10 are referred to below as "cable-side," while "device-side" elements are situated on the side of the device 50.

The plug part 10 includes a nonvolatile memory 13 and a microprocessor 14. The microprocessor is used for data processing, and may also be part of a larger unit, for example a microcontroller.

The memory 13 is designed as an individual memory unit or in the form of multiple memory units. Depending on the design, the plug part 10 may include an additional memory which is volatile and which forms, for example, a unit that is separate from the memory 13 or which together with same forms an overall unit. Depending on the intended application, the following information is stored in the memory 13:

- A signature which allows at least unique identification of the plug part 10.
- A list of the configuration parameters that are required for starting and/or operating the device 50.
- A table of the permissible combinations of hardware and software versions on the side of the device 50.
- Data which define the configuration and/or the intended purpose of the device 50. The data may contain, among other information, vendor-specific order numbers or the like, and in the event of a defect, for example, allow a suitable device 50 to be selected and used as a replacement. The data may also be selected in such a way that the plug part 10 is able to recognize whether the device 50 is a test unit that is used for testing a network (see explanations below).
- Data concerning a system of which the device 50 is a part. These data contain, for example, information about where the plug part 10 is present in the system, where the cable wires leading out from the plug part 10 end in the system, which electrical source or load is present at the end of a cable wire, and/or for which source or load a cable wire is used (generical with it data which characterize the field devices connected thereto).
- Data which the device 50 has ascertained during operation and stored in the memory 13 prior to being switched off, so that the data are available for further processing upon start-up of the device 50.
- One or more programs that are stored, for example, in the memory unit of the memory 13, where the data are stored, in a different sector, or also in a separate memory unit of the memory 13. These programs are designed for the following purposes, for example:
  Communication with the device 50,
  Evaluation of data that are stored in the memory 13 and/or transmitted by the device 50,
  Controlling the device 50 upon start-up and/or during operation,
  Testing the network.

The information in the memory 13 or portions thereof is preferably encapsulated, so that the device 50 is not able to directly access the information, and in addition it is not possible to impermissibly alter the information. Additionally or alternatively, the information may be protected by a key, so that querying, changing, and/or supplementing the information requires knowledge of the key.

The memory 13 is preferably designed in such a way that at least 1 kilobyte, preferably at least 2 kilobytes, and particularly preferably at least 5 kilobytes, is/are storable in the memory 13.

The plug part 10 also includes a communication unit 15 with an associated communication interface 16 for transmitting data to the device 50. On the device side, the mating part 1 includes a corresponding communication unit having a communication interface which is usable by the processing microprocessor 4 of the device 50, as indicated by the double arrow 5 in FIG. 1.

In the present exemplary embodiment, the plug part 10 is free of an independent power source (battery or accumulator). Power is supplied on the device side by the power source of the device 50, from which power is suppliable to an energy transmission interface 7 in the mating part 1, as indicated by the arrow 8 in FIG. 1. Power is suppliable via this energy transmission interface to an energy transmission interface 17 as part of the overall interface 19 of the plug part 10, by means of which the power supply 18 to the elements 13-15 is made possible.

The elements 13-18 enclosed by the dashed-line rectangle 20 in FIG. 1 thus form the intelligence system of the plug part 10, whereby the elements 16 and 17 together represent the overall interface 19 of the plug part 10 with the device 50. Similarly, on the device side the elements 6 and 7 form the overall interface 9 with the cable-side intelligence system 20.

The intelligence system 20 may be provided as an electronic circuit in integrated or discrete form. For example, the intelligence system may be designed as a single chip or a multichip.

From the standpoint of implementation, the interface 19, which is functionally divided into an interface with the energy transmission 17 and an interface with the data transmission 16, may be made up of two interfaces which are actually separate, or a combination of both.

Possible exemplary embodiments of a pure interface with the energy transmission 17 are as follows:

- For the sake of simplicity, the interface with the energy transmission 17 may be established via two additional auxiliary contacts in the plug part 10 which in the form of contact pins and/or contact openings are situated on plug elements, the auxiliary contacts being connectable to the complementary plug elements on the mating part 1. In that case, no direct galvanic separation between the intelligence system 20 of the plug part 10 and the device 50 is directly provided.
- Alternatively, a transformer embodiment, typically at low frequency, is possible: In this case, the secondary inductance which forms the load is present in the plug part 10, and is coupled via a magnetic circuit to the primary inductance, which serves as the source and is present in the device 50, preferably in the mating part 1. A galvanic separation between the intelligence system 20 of the plug part 10 and the device 50 is generally provided here.
- Another possible embodiment is a capacitive coupling in which a suitable surface of the mating part 1 is situated opposite from a suitable surface of the plug part 10, and the transition between the mating part 1 and the plug part 10 represents the dielectric of a capacitor that is formed by same.

Possible exemplary embodiments of a pure interface with the information transmission 16 are provided in the same way as for the above energy transmission interface 17, in that

- two additional auxiliary contacts are provided in the plug part 10,
- a transformer approach is provided, in which the secondary inductance in the plug part 10 is coupled to the device-side primary inductance via a magnetic circuit, or a capacitive coupling is provided in which, for forming a capacitor, a device-side surface is situated opposite from a cable-side surface.

Possible exemplary embodiments of a combined information transmission interface and energy transmission interface 16, 17 are as follows:

For combining both interfaces 16, 17, three or more additional auxiliary contacts may be provided in the plug part 10, the auxiliary contacts being situated on plug elements in the form of contact pins and/or contact openings which are connectable to the complementary plug elements on the mating part 1. In this way a serial bus (an I2C bus, for example), a parallel bus, or the like may be provided to allow transmission of power as well as bidirectional information.

Also possible is a transformer approach, with primary inductance in the device 50 and secondary inductance in the plug part 1, in that energy is transmitted at low frequency and information is transmitted at high frequency (or conversely, energy is transmitted at high frequency and information is transmitted at low frequency), in superimposed form, over the same magnetic circuit.

Another example of a combined interface 16, 17 is provided by the concept of the passive transponder, in that the transponder function is provided for the plug part 10, and the function of a reader is provided for the device 50, preferably for the mating part 1. In the process, the energy is transmitted at high frequency from the reader to the transponder, which thus feeds the intelligence system on the plug side, while the data are transmitted at low frequency, via the reader and transponder, from the microprocessor 4 to the communication unit 15 on the plug side, and thus to the microprocessor 14. This communication path is bidirectional, and the communication does not necessarily have to be initiated by the device-side reader or the device-side microprocessor 4; instead, it may be initiated by the intelligence system on the plug side. Likewise, a time-multiplexed configuration is possible in which an information transmission follows a stored energy transmission. The information transmission may be organized in a time-multiplexed manner, so that a phase for the requesting side is followed by a phase for the responding side. Thus, the concept of the passive transponder here is based only on the energy and data transmission, but not on the remaining (limited) functionality of a transponder.

FIGS. 2 through 6 show one possible exemplary embodiment of the mating part 1 and the plug part 10 in the form of a plug 1', and a coupling 10' having a cable 12, respectively.

The energy and data transmission has a wireless design here, in that the plug 1' has an antenna coil 35 (primary coil of the transformer) for a reader, and the coupling 10' has an antenna coil 41 (secondary coil of the transformer) for the reception of energy and for the communication electronics system 43.

Plug pins 32, which are placed in the original arrangement according to a given standard, for example, are inserted into an injection-molded body 31 of the plug 1'. For the device-side plug 1', the antenna coil 35 of the reader electronics system (not shown here) is inserted into or placed on the front face 33 of the injection-molded body 31. The connectors of this coil 35 are connected to the reader electronics system via two additional connector pins 37. The reader electronics system is configured for communicating with the plug-side intelligence system via the communication electronics system 43. An antenna coil 41 is cast or mounted in the injection-molded body 39 of the plug part 10' on its front side 40. The connectors 42 of this coil 41 are connected to the cable-side communication electronics system 43.

When the plug part 10' is plugged into the device-side plug 1', the front faces 33, 40 of these two parts 1', 10', respectively, are in precise axial, parallel alignment at a small distance from one another. They thus form a system that is able to transmit energy from the reader to the cable-side electronics system 43, and to transmit information to and from the electronics system 43 according to the energy-transferring concept of passive transponders. The reader electronics system in the plug 1' communicates with the electronics system of the device (not shown here), and vice versa.

An advantage of this embodiment is the passive, contactless communication. Likewise, all plug pins 32 of the plug 1' may be used without limitation when they are arranged according to a standard. Furthermore, a galvanic separation between the electronics system in the plug part 10' and the plug pins 32 is easily achievable.

Figure 7:
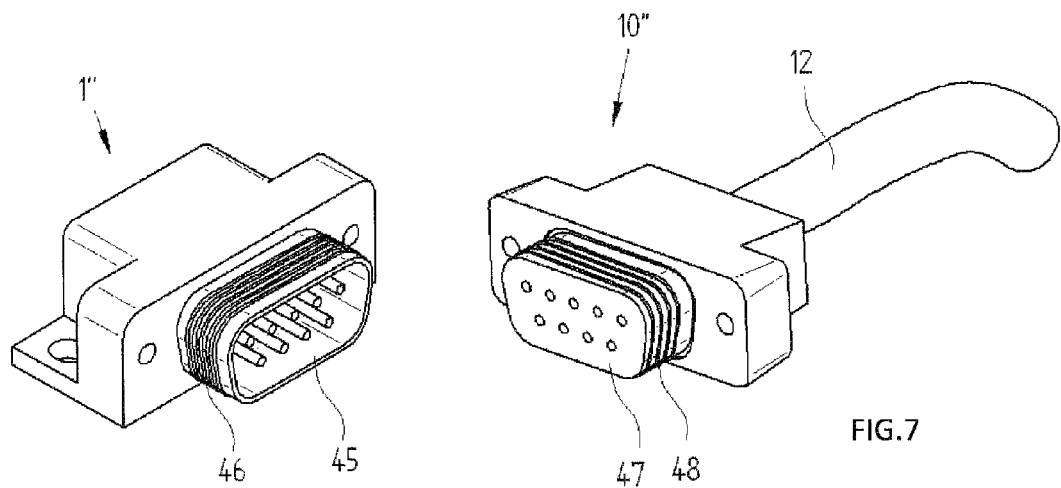
FIG. 7 shows another exemplary embodiment of the plug part and mating part, in a perspective view.

The implementation of the inductances over the surface, provided by the antenna coils 35, 41 as illustrated in FIGS. 2 through 6, may be replaced by some other type of implementation, for example a cylindrical coil-like implementation (see FIG. 7). The two coils are in each case to be designed in such a way that a close coupling of both coils results in order to limit an effect on other plugs possibly in the vicinity and to achieve efficient energy transmission. With regard to the cable lines, an arrangement of the coils that is orthogonal with respect to the cable lines, as is the case in the examples according to FIGS. 2 through 6 and FIG. 7, is advantageous in order to minimize effects on the cable lines on the cable side when there is a mutual coupling between the device-side inductance and the cable-side inductance.

FIG. 7 shows a variant of the mating part 1 and the plug part 10 in the form of a plug 1", and a coupling 10" having a cable 12, respectively. The plug 1" contains a plug collar 45 around which a coil 46 is wound. The plug part 10" has a protruding connecting body 47 which has a coil 48. The coils 46, 48 accordingly have a cylinder-like design. The same as for the example according to FIGS. 2 through 6, reader inductance and transponder inductance in the inserted state are closely coupled to one another, and thus form a coreless transformer having a primary coil and a secondary coil. The windings 46, 48 may also take over shielding functions with regard to the electromagnetic compatibility (EMC). Moreover, a shielding collar may be placed over the coil 46 of the plug 1" and/or below the coil 48 of the coupling 10" in order to additionally benefit the coupling properties and EMC properties with a suitable material selection.

Exemplary Embodiment of a Configuration and Authorization of a Device by Means of the Plug Part In certified systems it is necessary to ensure the correct hardware/software configuration and the required security level.

In particular for security-critical applications, such as aircraft or trains, a complete control system made up of hardware, software, and the entire associated periphery is validated for proper functioning, and this validation, in particular with regard to the safety-relevant functions, is certified for its functionality and regulatory conformity by an accredited test center for safety and quality, such as TÜV.

It is understood, of course, that at the present time this certification relates exclusively to the currently validated configuration of the hardware change status as well as the software version, together with the build number.

Any revision to this initial configuration must be documented based on difference descriptions, and "recertified" by the accredited test center. This may not be an insignificant undertaking for the producers, in particular in aircraft manufacturing.

The newly created hardware/software configuration cannot be integrated into normal use until after successful recertification.

In particular for systems that have been in service for a long time (usually longer than 20 years), it is often difficult to update the list of permissible, certified hardware/software configurations and to make it quickly available in the event of repairs or replacements.

The risk of using non-certified hardware/software configurations increases with the number of revisions made by the manufacturer, the variability of the systems delivered by the manufacturer, and with increasing length of service of the systems, also due to an ever-increasing obsolescence rate.

This is especially true when the device manufacturer or the system integrator is no longer responsible for system maintenance, and instead, the operator himself is responsible, and a satisfactory training level of maintenance personnel is not necessarily guaranteed.

This results in a fundamental administrative and organizational problem for the manufacturer as well as the system operator. This problem, of ensuring the exclusive use only of permissible hardware/software configurations, may be addressed by making the list of permissible, certified combinations available outside the devices, but still "on site." In this regard, it is possible to store this list in the, or a, cable-side plug part which contains information concerning the control system and also the field devices connected to the cable.

One exemplary embodiment is explained below, in which information in the plug part 10 is used for configuring the device 50 and authorizing its operation. The device 50 is part of an automation system, such as a certified system.

Figure 8:
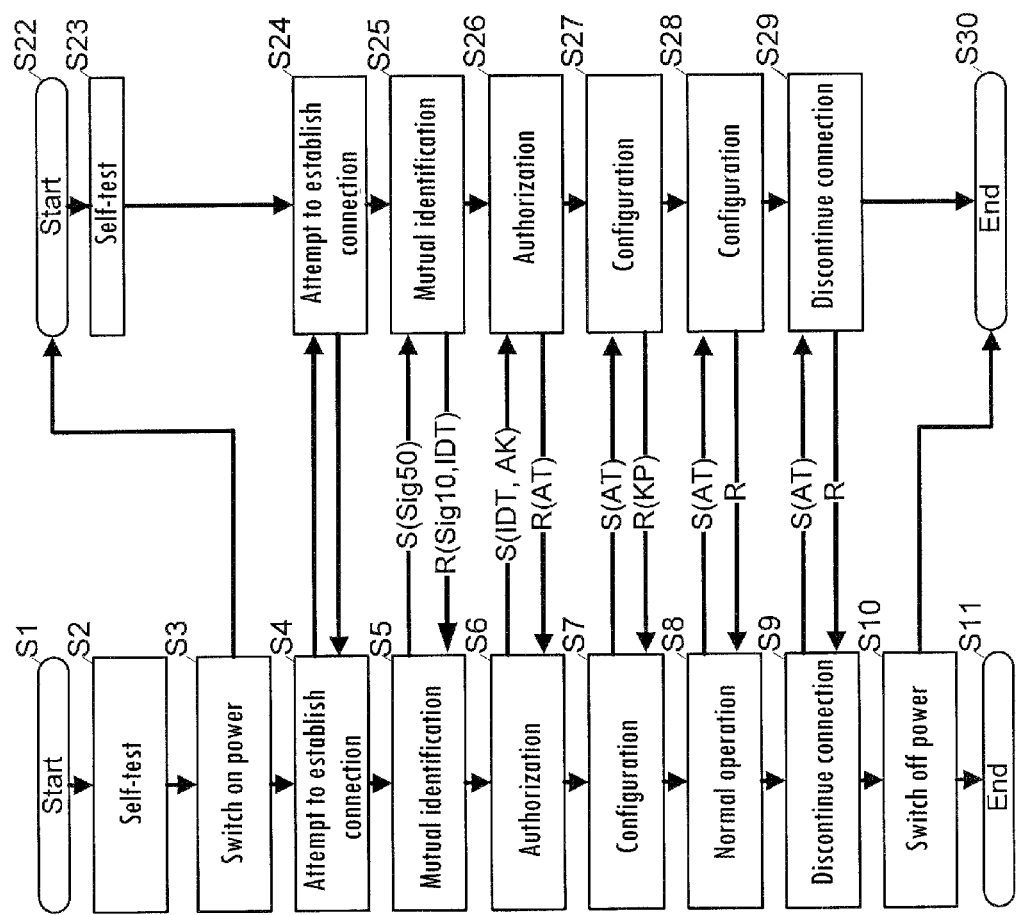
FIG. 8 shows a sequence of a first exemplary embodiment of an application.

FIG. 8 shows the conceptual sequence of the operations, where S1-S11 represent the steps carried out in the device 50, and S22-S30 represent the steps carried out in the plug part 10. The querying of information by the device 50 takes place, for example, in the manner of a service, and is indicated by an arrow denoted by S (service request) in FIG. 8. The subsequent response by the plug part 10 is indicated in each case by an arrow denoted by R (response).

The device 50 and the plug part 10 are configured in such a way, for example, that the device 50 contains only generic routines and is free of system-specific parameters, while the plug part 10 contains no device- or system-specific routines, but, rather, contains the parameters for same.

After being switched on, in step S1 in FIG. 8 the device 50 carries out a self-test S2 as the first operating phase, in which the functionality of the basic components of the device 50 is checked. The device subsequently switches on the power supply for the plug part 10 in step S3, which brings about start-up of the plug part 10 (step S22). The intelligence system of the plug part 10 likewise carries out a self-test S23.

The device 50 and the plug part 10 attempt to establish a communication relationship with one another in a subsequent step S4, S24, respectively. When this has been completed, the device 50 goes into the identification phase S5, and the plug part 10 goes into the identification phase S25. In this phase, the device 50 requests the plug part 10 for its signature Sig10, in addition to other information such as the type and description of the cable tree, to be able to identify the plug part, and the device in turn transmits its signature Sig50, which permits the identification of the device 50 by the plug part 10. It is thus known, on both sides, which is the mating part of a plug unit 1 or 10. In addition, based on the signature Sig50 of the device 50, the plug part 10 is able to recognize which type of communication device is involved, such as a measuring device, a configuration device, etc., and in which operating mode the connected device 50 is to be used, for example, as an automation system in the regular operating mode, or possibly as a test system in a safe simulation mode which is not critical with regard to security.

Based on the signatures, during the identification phase S5, S25 it may also be determined whether the cable-side plug part 10 matches the device-side mating part 1, or whether mismating is possibly present, for example when two identical plug parts 10 having different pin or signal assignments are used. This verification may be carried out on the device side and/or on the cable side.

In the identification phase S25, when the situation is correct, the plug part 10 transfers an identification token (IDT) which corresponds to the type and operating mode.

If the device 50 has an identification token, the device switches to the authorization phase S6. In this phase of the interaction between the device 50 and the plug part 10, a negotiation is made as to whether or not the device 50 is basically able to go into normal operation. For this purpose, the device 50 makes available to the plug part 10 a list, AK (current components), the hardware and loaded software components currently used by the device, and their description. (The description may include, for example, the type and change status of the device 50, in particular of the boards, versions or portions thereof (build numbers, for example) of safety-relevant software components, etc.) The plug part 10 now independently checks in step S26, based on the "table of permissible combinations of hardware and software versions" stored in the memory 13, as to whether or not this information corresponds to the list AK supplied by the device 50, and is thus a combination that is certified by an accredited test center. If this is a certified combination, and based on the identification token IDT it is recognized that normal operation of the device 50 is to be initiated, in step S26 the plug part 10 supplies an exclusive authorization token AT as a response, without which, in a manner inherent to the system, the connected device 50 cannot go into normal operation. However, the transmission of appropriate status messages may be provided via a communication medium, such as a display, if no AT is issued.

In a subsequent phase, the configuration phase S7 and S27, upon request by the device 50 and upon provision of the previously obtained exclusive authorization token AT, the plug part 10 delivers the configuration parameters KP which match the corresponding combination of hardware and software. These parameters have been stored beforehand in the list of the configuration parameters in the memory 13 of the plug part 10. These include, but are not limited to, the following by way of example: definitive addresses to which the device 50 is addressable via bus systems, assignment of signal levels to the contact pins of the device-side plug unit 1, also as a function of the field devices, filter parameters, magnification factors, etc., connected thereto. In the absence of the exclusive authorization token AT, the plug part 10 transmits no configuration data. Based on the received configuration data, the device 50, on the other hand, is then capable of being dynamically configured.

After the configuration, the device 50 goes into the last phase S8, the normal operation phase, and takes over its targeted task: The processing microprocessor 4 of the connected device 50 can terminate the communication relationship with the microprocessor 14 in the plug part 10 and switch off the feed to the cable-side intelligence system 20. However, the microprocessor may also carry this out only later, for example when the cable-side intelligence system 20 is to be used for further, in particular safety-relevant, tasks. In any case, the processing microprocessor 4 of the connected device 50 is now able to go into normal operation for reading, processing, communicating with the higher-level communication network, and outputting signals.

Prior to shut-off, the device 50 may optionally store the information, which may possibly be necessary for the further processing upon being switched on again, in the plug part 10 in a nonvolatile manner. The connection is subsequently routinely discontinued in S9, S29, and the feed to the plug part 10 is switched off in S10.

The advantages of this exemplary embodiment may be summarized as follows:

- All or certain parameters may be swapped out from the software components of the device into the plug part. These components may thus be swapped out in a purely generic (universal, general) manner.
- All or certain configuration data and/or safety-relevant data in the sense of object-oriented programming may be provided in encapsulated form by the intelligence system in the plug part. Therefore, these data cannot be directly read and used by the processing microprocessor of the connected device, or also without checking by the cable-side intelligence system, since the microprocessor, in a manner inherent to the system and design, does not know the internal structure of the information retention and its information representation in the cable-side memory, and the cable-side intelligence system independently carries out the evaluation of the data in the manner of a service. The encapsulation (information hiding) not only refers to the access-related aspect, but is also extended to the locational aspect (the information is stored in a different physical memory located elsewhere) and the operational aspect (the information is processed by a different processor).
- In addition, the procedure for booting the device may be designed so that it is parameter-free. This procedure may be verified and validated in this general (i.e., generic) form and formally approved by an accredited test center for security and quality. This procedure forms the core of the software, which is basically regarded as unalterable, and therefore is unaffected, even in the event of a recent download of additional software components.
- The device may be delivered in an unconfigured state. In case of a replacement, the old device is removed from the system, and a new device, even with a different change status, is installed. The software is downloaded, and prior to use is checked for compatibility with the current hardware. Thus, the exclusive use of only certified combinations of hardware and software versions may be enforced, and required system security may thus be guaranteed over the long term, also due to the fact that the device 50 does not read out the current version data from the memory of the plug part 10, and instead reads out this information directly from its own components in the device 50.
- If a new configuration of hardware and/or software is approved by an accredited test center, this may be carried out during the next routine maintenance of the system by updating the expandable table of permissible combinations of hardware and software versions and the list of configuration parameters in the cable-side plug part, without necessarily having to change the configuration being installed at the time. In this sense it is a preventative measure to prepare for a possible change in the software/hardware combination at the next service (even if it is not scheduled), and then to be able to carry this out very quickly.
- Just as quickly, in the event of repairs the maintenance personnel, using a suitable service unit, may obtain the order data and the system configuration from the cable-side plug part which is plugged into the defective device, and initiate a rapid (also automated) material order which is correct and which easily once again meets the stipulated safety requirements. Use of the wrong material is thus largely ruled out.
- When subsystems having the same design are used, it is likewise possible to individualize these using the information stored in the cable-side plug parts, which reduces the initialization effort ("setup"), for example for communication over a shared communication network.
- If a new combination of hardware and software versions is approved upon certification, by means of the service unit this combination may be made available to the microprocessor in the plug part, which correctly stores the combination internally. The service unit is set up in such a way that an authorization process and plausibility checking likewise take place when it is used, so that no unauthorized alteration of the key-protected table of the permissible combinations of hardware and software versions and the list of the configuration parameters is possible which is relevant to their safety.
- When a new software version is downloaded on the device, the download agent may likewise request the cable-side intelligence system for the information from the expanded table of permissible combinations of hardware and software versions, and conduct a preliminary check so that downloading of inappropriate software may be prevented even at this stage.

Exemplary Embodiment for Start-Up and Testing of Complex Networks

Networks, such as those for automation technology and/or those found in automobiles, trains, or aircraft, may have extremely complex designs, for example when, due to the variety in the connected devices and/or the lack of appropriate standards, different cables must be used. Likewise, the overall cabling is generally not set up using individual (single- or multi-wire) cables with a 1:1 relationship; rather, multiple cables and optionally also individual wires are combined into cable bundles (a cable tree) so that an n:m relationship results. These cable trees are often prefabricated, and are installed in the system as a unit at a suitable assembly time. Even if these cable trees can already be pre-assembled as prefabricated and pretested elements, during initial start-up it is generally absolutely necessary to check ("sound out") the point-to-point connection of each individual cable wire conductor. In the simplest case, therefore, only the ohmic connection from a connecting point of a certain device plug via the cable-side plug part to the connecting point of a device-side plug of a peripheral device such as an actuator, or in the reverse direction, from a sensor to a processing device, is tested. In more complicated test procedures, certain sources are connected to the plug, and at the remote end the signal quality is determined or the functionality of the connected peripheral device is checked.

Thus, during the initial start-up phase of the overall system, all connections for the control of peripheral devices (field devices: for example, control signals for the control elements used as actuators and their check-back signals, as well as sensors) are to be checked for correct connectivity. This connectivity includes the absence of short circuits, the continuity of the connections, and the connection of the correct, corresponding end points. Even when cable trees in the pre-assembled state have been installed and checked beforehand, this tedious yet error-susceptible activity cannot be omitted. With the aid of the "on-site information" in the cable-side plug parts and their complete detachability from the devices, at least on one side, this task may be simplified and speeded up by partial automation.

Figure 9:
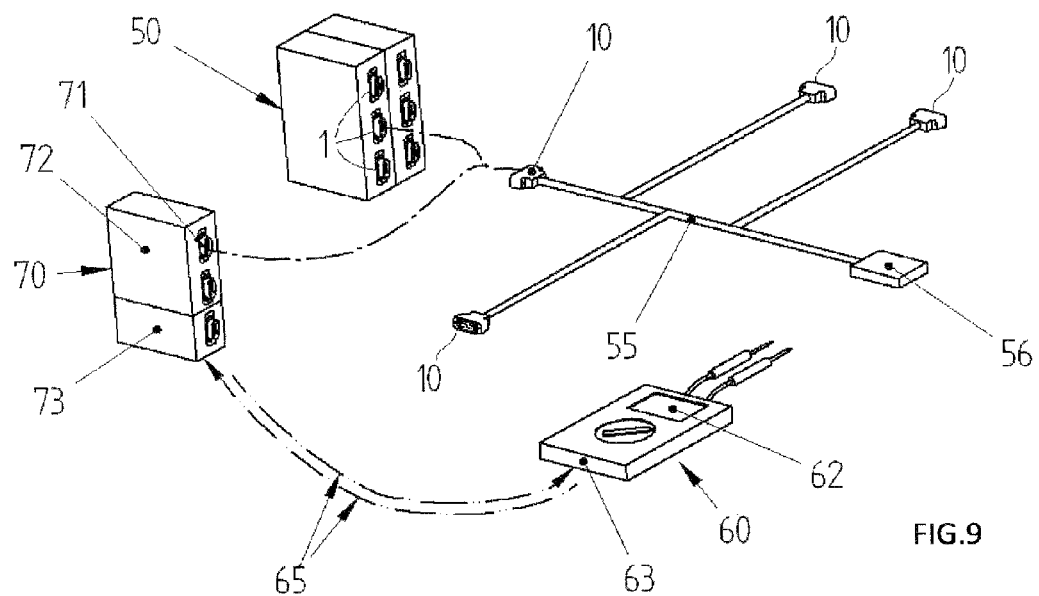
FIG. 9 shows a measuring device for testing a network, in a perspective view.

FIG. 9 shows one possible embodiment of a test apparatus.

The device 50 has one or more mating parts 1 as connectors. During normal operation, a plug part 10 is inserted into a mating part 1, so that the device 50 is connected via a cable tree 55 to a sensor or actuator 56, for example.

The test apparatus has a test unit 70 and a measuring device 60. The test unit 70 includes one or more connectors 71, at least one of which has the same design as a connector 1 of the device 50. The plug part 10 is thus insertable into a connector 71 of the test unit 70. The test unit also includes a test generator 72 and a communication master 73. The test generator 72 is universal, in that it is at least capable of representing all signal sources and/or loads that are typical for the system family and/or product family to be tested. The test generator is typically configurable in such a way that it has only generic routines, and contains neither system- or device-specific information nor parameters, since these have already been stored in the cable-side plug parts 10, for example during manufacture of the cable, and therefore are obtained from that location.

The measuring device 60 has a mobile design, and includes a measuring unit 62 and a communication slave 63. The measuring device 60 is configurable in such a way that it contains only generic routines, and contains no parameters which define the test, since these are provided by the test unit 70.

The communication master 73 and the communication slave 63 are set up for establishing a communication relationship 65, which preferably takes place wirelessly.

During the test, the test unit 70 is connected to the cable tree 55 instead of to the device 50. The connectivity of the cable tree 55 and/or the functionality of the other connected devices is/are checked, using the measuring device 60 together with the test unit 70.

As an alternative to this procedure, the test apparatus made up of the test unit 60 and the measuring device 70 may be universalized so that they form units having the same design, and which in each case may take over the role of either the measuring device or of the test unit, depending on the configuration.

Likewise, the test apparatus may be designed in such a way that the assignment of the master or slave functionality of the two devices 60, 70 is interactively selectable.

If the system and/or the devices has/have a secure simulation or test operation mode, the connected device 50 itself may also take over the role of the test unit 70, of the measuring device 60, or partial roles thereof.

Figure 10A:
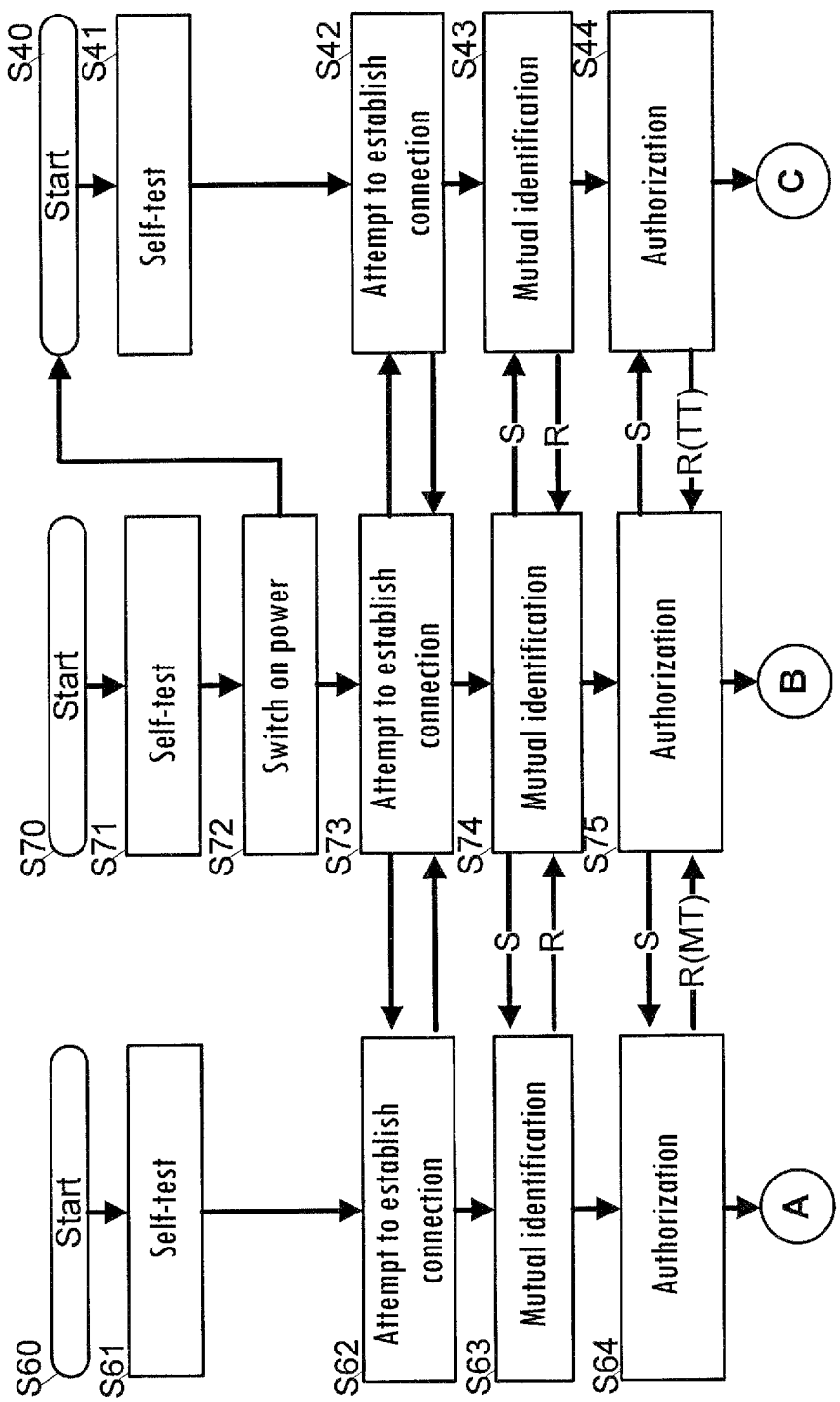

FIGS. 10a and 10b show an example of a sequence for testing a network. S60-S67 denote the steps that are carried out in the measuring device 60, S70-S82 denote the steps that are carried out in the test unit 70, and S40-S47 denote the steps that are carried out in the plug part 10. The transition from the last step in FIG. 10a to the next step in FIG. 10b is indicated in each case by the encircled letters A, B, and C.

The querying of information by the test unit 70 which is delivered by the measuring device 60 and by the plug part 10 takes place, for example, in the manner of a service, and is indicated by an arrow denoted by S (service request) in FIGS. 10a and 10b. The subsequent response by the measuring device 60 or the plug part 10 is in each case indicated by an arrow denoted by R (response).

The memory 13 of the plug part 10 contains, among other things, information which defines how the plug elements of the plug part 10, which are present as pins, for example, are associated with other plug elements for other plug parts 10 via the cable tree 55. This information may be provided as follows, for example:

Based on the circuit diagrams recorded using CAD, a network list is generated directly from CAD. This network list completely describes which connection from which pin of a plug to which pin of another plug must be achieved at a different location. (The particular plug is implemented on a device 50 by the plug part 10 or the mating part 1.)

A plug-based list is created from the network list by regrouping the information contained therein.

This plug-based list together with at least a plug-specific signature is programmed into the nonvolatile memory 13 of the plug part 10, typically during prefabrication of the cable tree. The location of the plug within the system, the manner of testing the connection, and other relevant information (for example, the location where measurement is to take place) are likewise stored.

This list represents the "list of test sequences."

Thus, all information (including the plug identifier) that is necessary for testing the cabling during initial start-up of the system is present in the cable-side plug parts 10.

The individual steps according to FIGS. 10a and 10b are now as follows:

Self-test phase: When the test unit 70 is switched on (step S70 in FIG. 10a), it conducts a self-test (step S71), and in principle is then ready for carrying out testing operations.

The actual testing of the cable tree 55 of a system begins with the initial plugging in of a first plug part 10 into the test unit 70.

The test unit 70 switches on the power supply for the cable-side intelligence system of the plug part 10 (step S72).

After the self-test of the intelligence system 20 of the cable-side plug part 10, the latter takes part in the establishment of communication with the test unit 70 (steps S42 and S73), and communication takes place.

Identification phase: The test unit 70 and the intelligence system 20 of the plug part 10 exchange signatures with one another (steps S43 and S74).

Authorization phase: The intelligence system 20 of the plug part 10 recognizes the device as an appropriate test unit 70 based on its signature, and authorizes the device to access its list of test sequences. This is signaled to the test unit 70 by an exclusive test token (denoted by reference character TT in FIG. 10a) (steps S44 and S75).

Similarly, after being switched on, the measuring device 60 carries out a self-test (steps S60 and S61), establishes a connection with the test unit 70 (steps S62 and S73), and exchanges its signature with the test unit 70 (steps S63 and S74). The subsequent authorization phase between the devices 60 and 70 proceeds in the same way as between the test unit 70 and the plug part 10 (steps S64 and S75). Instead of a test token TT, the test unit 70 obtains a measurement token (denoted by reference character MT in FIG. 10*a*), which the test unit uses in each case for authorization for service requests to the measuring device 60.

When all three units (measuring device 60, test unit 70, and plug part 10) have concluded the authorization phase, the overall system is ready for a first measuring operation:

The test unit 70 has the test token TT, and may thus request test sequences from the intelligence system 20 of the cable-side plug part 10. Without the test token TT, the intelligence system 20 of the plug part 10 delivers no test sequence instructions. The intelligence system 20 of the plug part 10 now delivers a (first) test sequence as a response to a test sequence request.

For controlling the test sequences during step S45, the plug part 10 in each case accordingly carries out the following substeps: checking the TT, reading the first or next test sequence from a table, and responding to a service request S(TT) by the test unit 70.

Each test sequence during step S76 includes a configuration phase and a test phase, each having the following substeps:

Configuration phase:
Request and interpret a test sequence
Self-configuration
Initiate the measurement operation
Transmit the expected measured value
Test phase:
Connect the test signal
Receive the measuring result
Conduct plausibility checking of the measuring result and repeat if necessary
Record the measured value
Disconnect the test signal
Request a new test sequence or exit block S76

The measuring sequence during step S65 includes a configuration phase and a measurement phase, each having the following substeps:

Configuration phase:
Check the measurement token MT
Display the action expected by the user
Prepare for the measurement (configuration)
Wait for acknowledgement by the user
Measurement phase:
Check the measurement token MT
Carry out the measurement
Transmit the measuring result
Display the measuring result The detailed sequence during steps S76 and S65 is as follows:

During the configuration phase:
a. The test unit 70 interprets a test sequence instruction.
b. The test unit 70 configures itself in accordance with this instruction (for example, not as a current source, but as a voltage source with a certain voltage level and/or current limiting and/or other typical parameter values that are a part of the test sequence description).
c. The test unit 70 communicates with the measuring device 60 and instructs its user concerning the action to be taken (for example: "Measure the signal at a certain contact pin of a certain plug").
d. The test unit 70 reports to the measuring device 60 the expected measured value, to which the measuring device 60 may correctly configure itself. (The test unit 70 authorizes itself with respect to the measuring device 60 with the measurement token MT.)
e. The test unit 70 is expecting as a response a "ready" message from the measuring device 60, i.e., that the measuring device 60 has completed the configuration (measuring range selection, for example), and the user of the measuring device 60 has acknowledged this requested action during and at the measuring point.
0. The test unit apparatus goes into the test phase after receiving the acknowledgement.

In the test phase:
a. The test unit 70 connects the preconfigured test signal to the contact pin of the inserted plug part 10 that has been requested according to the current test sequence instruction.
b. The test unit 70 signals the measuring device 60 to actually carry out this measurement.
c. The test unit 60 receives the measured value, measured by the measuring device 60, as a response to this service request S(MT).
d. The test unit 70 compares the measured value to the expected value.
e. The test unit 70 notifies the user, via the measuring device 60, of the measuring result, and in the event of error, prompts the user to repeat the measurement.
f. The test unit 70 records the definitive measuring result.
g. The test unit 70 disconnects the test signal after the measurement is completed.
h. The test unit 70 requests the next test sequence instruction from the intelligence system 20 of the cable-side plug part 10.
i. The test unit 70 goes back into the configuration phase after receiving a new test sequence instruction. However, if the test unit 70 receives a message containing an abort criterion instead of a new test sequence instruction, it exits this loop of the execution of test sequences of a plug part (internal iterative loop).

The testing of a plug part 10 thus terminates when the test unit 70 no longer receives a test sequence instruction, but instead receives a message containing an abort criterion.

Based on this abort criterion, the test unit 70 exits the intelligence system 20 of the plug part 10 in order to quit the test sequence control. The test token TT issued during the authorization phase thus loses its validity. Upon exit from the test sequence block S76, the communication relationship with the cable-side plug part is also terminated (steps S77 and S46), but not the communication relationship with the measuring device 60.

The plug part 10 which is inserted into the test unit 70 may subsequently be removed from the test unit 70 and inserted into the device 50.

A next plug part 10 may subsequently be inserted into the test unit 70, and the procedure starts over with step S40 for the new plug part 10 (iteration via the plug: external iterative loop) upon start-up, then the self-test of the cable-side plug part 10, followed by the establishment of communication, the identification phase, and the authorization phase, and subsequently the execution of the test sequences, and so forth.

If the cable tree 55 has plug parts which contain no intelligence system that is like the intelligence system 20 of the plug part 10, the wires in question must be tested in the conventional manner.

The cable tree 55 of a system is subsequently tested.

Upon exiting the external iterative loop during step S78, the measuring device 70 is also returned to its initial state, and the communication relationship between the measuring device 70 and the test unit 60 is discontinued (steps S66 and S79).

The test is documented, for example, by printing out a test report (step S80).

The above-described testing of a network has the following advantages, among others:

Reduction in the susceptibility to error in the test sequences

Reduced number of required start-up personnel; in some circumstances, the testing may even be carried out by one person Significant reduction in the initial start-up time Increased quality Recorded, verifiable checking of a network of any system in serial production After conclusion of start-up, a complete test report may be printed out and archived for quality assurance. The reporting is thus carried out automatically, and documented on a system-specific basis.

The concept and advantages of the subject matter described herein may be summarized as follows:

An intelligent plug part may be provided which is implementable in automation systems or similar systems for plug-in connections of cable trees to devices, and which is able to check the plausibility of the correctness of the subsystem wiring, to control test sequences for measuring even individual cable wires, to check required device configurations in hardware and software, and to enforce the correctness of the configuration by securely blocking the normal operating mode. Likewise, the plug part is able to describe the requirements for the sources and loads to be connected.

In contrast to customary plug parts, at least semi-autonomous functions may be assigned to the plug part according to the invention on account of its intelligence system. It is thus possible to carry out more extensive testing than is customary.

Information, in particular information that is already present in electronic form, may be stored in the memory of the plug part according to the invention and thus utilized. Thus, for example, during a modern system projection using CAD tools (Electro CAD, for example) it is possible to create circuit diagrams, terminal diagrams, and the like which describe the functionality, and which are thus available in electronic form. Thus, the task of the cable trees, and which devices are to be connected to which other devices, and how, may also be provided as a network list. Likewise, the characteristic properties of the devices that are used may be extracted from device descriptions and device data sheets, and electronically displayed.

The plug part described here forms an intelligence system which is located on site and provides the necessary information, processing options, and communication capability, for example:

to be able to recognize the cable tree via a signature, to be able to recognize the plug part via a signature, to be able to recognize the device via a signature, to allow plausibility checking of whether the plug and coupling belong to the created circuit diagram, to allow a description of what type of source is expected by a certain cable wire (plug pin) from the opposite side, and vice versa, to allow a description of what type of load is to be driven over a certain cable wire (plug socket), for safety-relevant applications with explicitly appraised and certified device/hardware-software combinations, for example for increased security requirements of safety integrity level (SIL)>1, to also allow enforcement of a secure, certified combination of hardware/software components based on the necessary device change statuses stored in the plug part, and the necessary software version which matches same, the overall system, in particular of the cable tree, to be controlled, or at least influenced based on its stored information, to configure a device (operating equipment), for example to establish the type of source (voltage source or current source), also as a function of the connected field device, of filter characteristics, of scaling variables such as magnification factors, of the assignment of addresses for the communication, etc.

to allow this configuration to be carried out as a function of the given hardware change statuses and software version, to allow this configuration to be carried out and revised as a function of the operating mode (measurement mode, normal operation mode, simulation mode).

In summary, this list, which is not exhaustive, shows that the interface of the disconnectable system "device→coupling→plug→cable start→cable end→coupling→plug→load" and also of the device and of the load itself may be described in detail, and thus allows extensive testing of the overall system in an autonomous manner without adversely affecting the character of a cable tree, which is intrinsically passive.

This concept thus replaces or supplements, for example, simple mechanical encoding of plugs, makes it possible to configure the connected devices (for example, assigning addresses to communicative systems, setting of necessary filter parameters, determining the type of signal sources or power sources (the character of current sources or voltage sources, etc.)) with the aid of electronic elements, so that electromechanical elements such as rotary switches or jumpers may be dispensed with. It is possible for this type of information concerning address, configuration, parameters, and test to be provided stored neither implicitly in the execution software of the device nor in the device itself, but, rather, stored outside the device. The intelligence system is relocated into the plug part to thus be able to take over active control functions or to save the stored data with protection against access.

The following benefits thus result:

Flexibility in the event of future changes

Increased personal security

Protection from material damage

Simplification of initial start-up procedures

Automation of troubleshooting processes, and therefore cost and time savings

Long-term assurance of conformity with certified overall system combinations.

What is claimed is:

1. A plug part that is connectable to a mating part for forming a plug-in connection, the mating part being a connector for a device, the plug part comprising at least one nonvolatile memory and a communication unit, wherein the plug part further comprises a microprocessor, and a cable leading out from the plug part as a connector to a network, the plug-in connection enabling an exchange of information between the device and the network via the plug part, wherein information is stored in the memory, which, for authorizing operation of the device, comprises permissible combinations of hardware and software versions.

2. Plug part according to claim 1, wherein software for controlling the device is stored in the memory.

3. Plug part according to claim 1, which is configured for initiating, also autonomously, communication with the device.

4. Plug part according to claim 1, which is configured for evaluating at least one of information that is stored in the memory and information transmitted by the device, in order to generate control signals configured to perform at least one of enable or block the device for operation and configure the device for operation.

5. Plug part according to claim 4, wherein the device has various operating modes, and the generated control signals are used for at least one of the following: selectively enable or block the device for at least one operating mode, and configure the device for at least one operating mode.

6. Plug part according to claim 1, wherein at least one of the following pieces of information is stored in the memory:
configuration parameters that are required for at least one of starting the device and operating the device,
permissible certified combinations of hardware and software versions,
the type of device for defining its functionality, wherein the type defines at least one of the following devices: automation device, field device, test device for generating test signals which may be applied to a network, measuring device for detecting measuring signals generated by the test signals,
configuration parameters for configuring the device as at least one of a test device and a measuring device,
at least one evaluation algorithm for evaluating at least one of data stored in the memory and data transmitted by the device,
information concerning the network, wherein the mating part of the device is used as a connector to the network, wherein the information concerning the network includes at least one of start and end points in the network of the cable wires leading out from the plug part, and information concerning the sources and loads that are connected by these cable wires,
a signature for uniquely identifying the plug part,
at least one control algorithm for testing the network,
a table of test sequences which defines at least: points in a network to be measured, design of the test signals as a function of these points, setpoint measured values, criteria which establish the permissible deviations of the measuring signals, generated by the test signals, from the setpoint measured values.

7. Plug part according to claim 1, wherein information is stored in the memory, the information is at least one of the following: encapsulated, so that it is not directly readable by the device and key-protected.

8. Plug part according to claim 7, wherein at least one of the encapsulated information and key-protected information is accessible via a service request by the device only after the plug part has transmitted a token back to the device in order to establish at least one of the access options of the device to the information in the memory, and the permissible operating modes of the device.

9. Plug part according to claim 1, which has an interface for the wired or wireless transfer of information to the device.

10. Plug part according to claim 1, further comprising an energy receiver for supplying power to the plug part via the mating part, wherein the energy transfer from the mating part to the plug part is wireless or wired.

11. Method for programming a plug part according to claim 1, comprising performing at least one of the following operations on information that is saved in the memory of the plug part: reading the information, changing the information and storing the information in the memory.

12. The plug part according to claim 1, wherein the plug part is free of a power source.

13. In combination,
a plug part that is connectable to a mating part for forming a plug-in connection, the mating part being a connector for a device, the plug part comprising at least one nonvolatile memory and a communication unit, wherein the plug part further comprises a microprocessor, and a cable leading out from the plug part as a connector to a network, the plug-in connection enabling an exchange of information between the device and the network via the plug part, wherein information is stored in the memory, which, for authorizing operation of the device, comprises permissible combinations of hardware and software versions; and
a device which includes at least one mating part for forming a plug-in connection with the plug part.

14. The combination according to claim 13, wherein the device has one or more operating modes, and wherein information is stored in the memory of the plug part, the information being evaluatable by the microprocessor of the plug part in order for at least one of the following: to enable or block the device for a specific operating mode in each case, and to configure the device.

15. The combination according to claim 13, wherein a plug part signature that is stored in the memory of the plug part allows unique identification of the plug part, wherein a device signature is stored in the device, the device signature allowing unique identification of the device.

16. The combination of claim 15, wherein the plug part, after receiving and checking the device signature, is configured for transmitting to the device a token corresponding to the result of the check in order to make information that is stored in the memory of the plug part available to the device.

17. The combination according to claim 13, wherein the device is designed for normal operation, and wherein a list of permissible combinations of hardware/software versions is stored in the memory of the plug part, and device information from the current hardware and software of the device is stored in the device, wherein the plug part or the device has a software unit which is unalterable and certified, wherein the software unit is configured for comparing the device information concerning the current hardware/software combination to the list and checking for permissibility of the device information.

18. The combination according to claim 17, wherein the plug part and the device are configured in such a way that during an authorization phase, a token is transmitted from the plug part to the device, by means of which the further service access of the device to the information in the memory of the plug part is authorized.

19. The combination of claim 17, wherein the device is configured in such a way that it is not able to go into normal operation without checking the permissibility and its verification.

20. The combination according to claim 13, wherein at least one of encapsulated information and key-protected information is stored in the memory of the plug part, and wherein the device is at least one of a reader and recording device, which is configured to perform at least one of the following: read, modify, and supplement the information.

21. The combination according to claim 13, wherein start-up software is stored in the device, the start-up software specifying the start-up of the device and having the definable parameters which are stored in the memory of the plug part.

22. The combination according to claim 13, wherein the mating part of the device has one or more of the following properties:
the mating part is used as a connector to a network,
the mating part is used as a connector for configuring the device so that the latter has an additional connector to a network,
the mating part is in operative connection with a microprocessor of the device,
the mating part is situated on a housing of the device.

23. Method for operating a device, comprising:
providing a plug part that is connectable to a mating part of the device for forming a plug-in connection with the device, the mating part being a connector for the device, the plug part comprising at least one nonvolatile memory and a communication unit, wherein the plug part further comprises a microprocessor, and a cable leading out from the plug part as a connector to a network, the plug-in connection enabling an exchange of information between the device and the network via the plug part, wherein information is stored in the memory, which, for authorizing operation of the device, comprises permissible combinations of hardware and software versions,
connecting the plug part to the device by the mating part for forming a plug-in connection with the plug part, and
supplying the device with the information stored in the memory of the plug part.

24. A test apparatus for testing a network, the network comprising plug parts and devices, wherein a plug part is connected to a mating part of a device for forming a plug-in connection and comprises at least one nonvolatile memory, a communication unit, a microprocessor, and a cable leading out from the plug part, wherein the test apparatus has at least one mating part for forming a plug-in connection with a plug part, and is configured for generating test signals from information that is stored in the memory of the plug part, the test signals being applicable to wires of the cable leading out from the plug part in order to generate measuring signals, the test apparatus comprising a test device including the at least one mating part and a measuring device in order to carry out measurements at certain locations in the network, wherein the measuring device is mobile with respect to the test device.

25. Test apparatus according to claim 24, in which a test program for generating the test signals is stored, the test program requiring configuration parameters to carry this out, wherein these configuration parameters are definable using information that is stored in the plug part.

26. Test apparatus according to claim 24, which is configured for requesting from the plug part information containing setpoint measured values, receiving the measuring signals generated by the test signals, comparing the measuring signals to the setpoint measured values, and generating an error signal in the event of predefined deviations.

27. Test apparatus according to claim 24, wherein the test device and the measuring device are set up for wireless transmission of information.

28. Test apparatus according to claim 27, wherein the measuring device has output means, for providing instructions to a user, and has input means for inputting information by the user.

29. Test apparatus according to claim 27, wherein at least one of the devices connected to the network has at least a normal operating mode and a test mode, wherein the device is used as a test device or measuring device in the test mode.

30. Test apparatus according to claim 24, which is configured for creating a report of the test sequence and swapping out the report from the test apparatus.

31. Method for testing a network, comprising:
providing a test apparatus for testing the network, the network comprising plug parts and devices, wherein a plug part is connected to a mating part of a device for forming a plug-in connection and comprises at least one nonvolatile memory, a communication unit, a microprocessor, and a cable leading out from the plug part,
wherein the test apparatus has at least one mating part for forming a plug-in connection with a plug part, and is configured for generating test signals from information that is stored in the memory of the plug part, the test signals being applicable to wires of the cable leading out from the plug part in order to generate measuring signals, and
wherein the test apparatus comprises a test device including the at least one mating part and a measuring device in order to carry out measurements at certain locations in the network, wherein the measuring device is mobile with respect to the test device;
connecting the test apparatus to the network by the mating part, and
testing the network using the information that is stored in the memory of the plug part.

* * * * *